United States Patent [19]
Yoshikawa et al.

[11] Patent Number: 5,833,340
[45] Date of Patent: Nov. 10, 1998

[54] SENSORY INTEGRATION SYSTEM AND IMAGE DISPLAY DEVICE AND CONCAVE MIRROR FOR USE IN THE SAME SYSTEM

[75] Inventors: Hiroki Yoshikawa; Tetsu Ohishi, both of Hiratsuka; Hideo Tanide, Yokohama, all of Japan

[73] Assignee: Hitachi, Ltd., Tokyo, Japan

[21] Appl. No.: 524,173

[22] Filed: Sep. 6, 1995

[30] Foreign Application Priority Data

Sep. 6, 1994 [JP] Japan .................................. 6-212328

[51] Int. Cl.[6] .................................................. G03B 21/14
[52] U.S. Cl. ............................... 353/98; 353/94; 359/853
[58] Field of Search .................................. 353/98, 99, 37, 353/77, 94, 69, 70, 79; 359/451, 631, 459, 853, 867, 868, 869, 893; 348/443

[56] References Cited

U.S. PATENT DOCUMENTS

| | | | |
|---|---|---|---|
| 3,348,897 | 10/1967 | Hourdiaux | 359/451 |
| 3,784,742 | 1/1974 | Burnham et al. | 359/451 |
| 4,022,522 | 5/1977 | Rain | 359/451 |
| 4,299,446 | 11/1981 | Jenkins, Jr. | 359/869 |
| 4,750,808 | 6/1988 | Nash | 359/451 |
| 5,112,121 | 5/1992 | Chang et al. | 353/94 |
| 5,200,854 | 4/1993 | Ogino et al. | 359/451 |
| 5,477,394 | 12/1995 | Shibazaki | 353/78 |
| 5,521,658 | 5/1996 | Donohoe | 353/98 |

*Primary Examiner*—William Dowling
*Attorney, Agent, or Firm*—Fay, Sharpe, Beall, Fagan, Minnich & McKee

[57] ABSTRACT

A concave mirror which has rigidity higher than an aluminum foil mirror and is light-weight and low cost compared with a polished glass mirror is composed of at least one concave mirror unit of a synthetic resin material molded to a concave shape and an aluminum reflecting layer vapor deposited on a front or rear surface of the concave mirror unit. A low cost image display device capable of projecting an image onto the concave mirror without using any specially designed projection lens includes at least a projection type cathode ray tube having a flat or substantially flat phosphor surface panel and a transmission type screen and the concave mirror. A multi-screen system which includes a plurality of the image display devices juxtaposed to provide an increased horizontal view angle is provided. Further, a sensory integration system using the image display device is provided.

49 Claims, 11 Drawing Sheets

SENSORY INTEGRATION SYSTEM AND IMAGE DISPLAY DEVICE AND CONCAVE MIRROR FOR USE IN THE SAME SYSTEM

BACKGROUND OF THE INVENTION

The present invention relates to a sensory integration system exemplified by a simulator, a video game system, a VR (virtual reality) device, etc., and an image display apparatus equipped with a concave mirror for use in the sensory integration system. The present invention also relates to the concave mirror.

With the recent rapid development of computer technology, it has become possible to economically generate an interactive graphic video image and thus the use of a sensory integration system such as simulator, video game system, VR device, etc., is having been wide spread.

The term "sensory integration system" used in this specification means a system which gives a reality to a user by exciting all or some of his perception including visual sense, hearing sense and motional sense for acceleration and vibration, etc., simultaneously and is usually constructed with an image display system for visual sense excitation, a sound creating system for hearing sense excitation and a motion system for exciting motional sense. Outputs of these systems of the sensory integration system, which may be image, sound, acceleration and vibration, etc., are organically combined to give a reality and/or special feeling to the user of the sensory integration system.

Among these systems which constitute the sensory integration system, the image display device which excites the visual sense is most important and a variety of image display devices have been proposed. Among others, an image display device equipped with a concave mirror can produce a deep image and has been implemented in such as flight simulator as disclosed in, for example, Japanese Patent Publication No. S55-13031 discloses an image display apparatus for a flight simulator.

Figure 20:
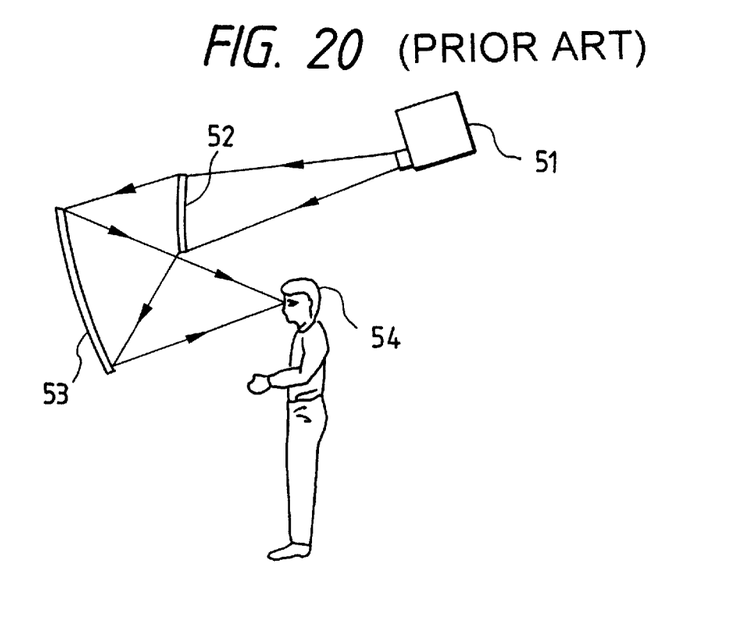
FIG. 20 shows schematically a conventional image display apparatus using a conventional concave mirror and a conventional image projector.

FIG. 20 corresponds to FIG. 2 of the Japanese Patent Publication No. S55-13031 and shows the image display device having a concave mirror, schematically. In FIG. 20, a reference numeral 51 depicts an image projector, 52 a transmission type screen for forming an image projected from the image projector 51 and 53 a concave mirror for reflecting the image on the transmission type screen 52 to a viewer 54. As to a positional relation of the viewer to these components, the viewer 54 is positioned in the vicinity of a center of curvature of the concave mirror 53 and the transmission type screen 52 is positioned above the observer vertically and in an intermediate position between the viewer 54 and the concave mirror 53 horizontally, that is, the screen 52 is positioned in the vicinity of a focal point of the concave mirror 53. With the arrangement of the components mentioned above, an image projected from the image projector 51 onto the transmission type screen 52 and reflected by the concave mirror 53 becomes a virtual image on an image forming plane at substantially infinite distance point, which is observed by the viewer 54 as a deep image.

Such image having deep feeling is extremely effective when a pilot in a flight simulator who is intending to land on a air field estimates a distance up to an approach to a runway visually.

In order to provide such deep image, the image projector 51, the concave mirror 53 having a large radius of curvature and the transmission type screen 52 having a substantially spherical plane whose radius of curvature is about a half of that of the concave mirror 53 are required.

The conventional concave mirror 53 is usually an aluminum foil mirror or a polished glass mirror. The aluminum foil mirror is featured by light weight and low cost. However, it is difficult to maintain the quality of the foil mirror surface high and an image on the aluminum foil mirror is vibrated when the latter is vibrated by a motion system. The polished glass mirror may solve these problems inherent to the aluminum foil mirror. However, the glass mirror is heavy and its manufacturing cost is high.

The image projector 51 which projects the image on the substantially spherical screen 52 must be provided with a special projection lens which is usually high cost, causing the cost of the image display device 51 to be very high.

SUMMARY OF THE INVENTION

An object of the present invention is to provide a concave mirror which is relatively rigid and light weight and can be manufactured at low cost compared with the polished glass mirror.

Another object of the present invention is to provide an image projector with a transmission type projection screen, which is capable of projecting an image through the transmission screen onto a concave mirror without using a specially designed projection lens.

Another object of the present invention is to provide an image projector with a transmission type screen, which is suitable for use in a multi-screen system.

Another object of the present invention is to provide an image display apparatus having either or both of the concave mirror and the image projector.

A further object of the present invention is to provide a sensory integration system having the image display apparatus.

According to the present invention, a concave mirror is composed of at least a concave mirror piece of a synthetic resin material molded to a concave shape and an aluminum layer vapor deposited on the concave mirror piece as a reflecting layer. A plurality of concave mirror pieces each prepared similarly with an aluminum layer thereon may be combined to provide a single concave mirror.

An image projector according to the present invention comprises at least a projection type cathode ray tube having a flat or substantially flat phosphor surface panel and a substantially spherical transmission type screen.

The concave mirror of the present invention which is formed by molding synthetic resin has a rigidity higher than the conventional aluminum foil mirror and is light weight and low cost compared with the conventional polished glass mirror. Further, since it is possible to project an image from the image projector through the substantially spherical transmission type screen without using any specially designed projection lens, it is possible to substantially reduce the cost of the image projector. With using either or both of the present concave mirror and the image projector with the transmission type screen, an image display apparatus and a sensory integration system can be provided.

DETAILED DESCRIPTION OF THE PREFERRED EMBODIMENTS

Figure 1:
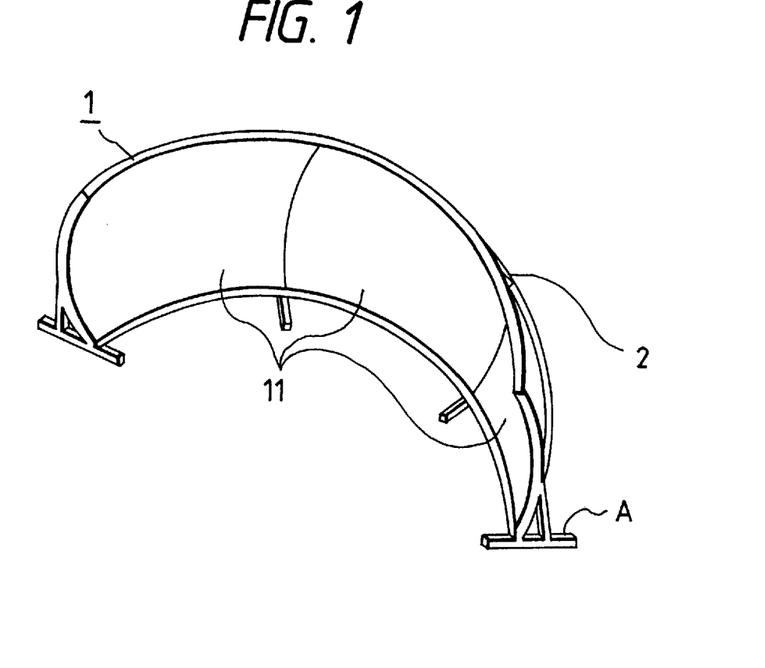
FIG. 1 is a perspective view of a concave mirror of an image display device, according to a first embodiment of the present invention.

FIG. 1 is a schematic perspective view of a concave mirror according to an embodiment of the present invention.

In FIG. 1, a concave mirror 1 is constituted with three concave mirror pieces 11 which are supported in predetermined positions by a frame 2 having leg portions A so that the concave mirror 1 can stand upright.

Each concave mirror unit 11 is of synthetic resin. Although highly transparent, methyl methacrylate resin is optimal for the synthetic resin, any resin may be used therefor by employing a forming method of a reflecting layer of the concave mirror piece in concomitant with the resin used, as will be described later. An example of a forming process of the concave mirror piece 11, which is a vacuum forming process, will be described with reference to FIG. 2.

Figure 2:
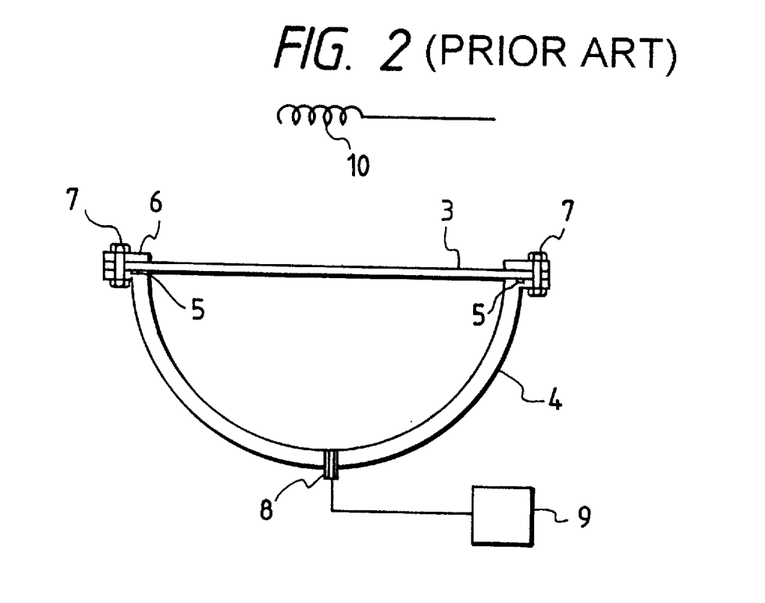
FIG. 2 illustrates a method of manufacturing the concave mirror shown in FIG. 1.

In FIG. 2 which shows a device for forming a single concave mirror piece 11 which may constitute the concave mirror 1 according to the vacuum forming process, a circular plastic disk 3 is fixed hermetically at its periphery to a peripheral flange portion of a metal die 4 in the form of a semi-sphere having a semi-spherical inner surface, through a rubber packing 5, a circular gland 6 and bolts 7. A pipe fitting 8 for air purge is provided in a center portion of the semi-spherical metal die 4, which is connected to a vacuum pump 9. A heater 10 is provided above the synthetic resin plate 3.

By drawing air in a space defined by the circular plastic disk 3 and the semi-spherical metal die 4 by the vacuum pump 9 while heating the plastic disk 3 by the heater 10, the plastic disk 3 is softened and deformed inwardly and adhered to the semi-spherical inner surface of the die 4. After cooling the die, the semi-spherical molded resin is derived from the die, a flange portion thereof is cut away and a reflecting layer is formed on an inner surface of the molded resin.

Other methods than the vacuum forming process mentioned above may be used to form the semi-spherical molded resin. For example, a blow forming process may be used therefor, which will be described with reference to FIG. 3.

Figure 3:
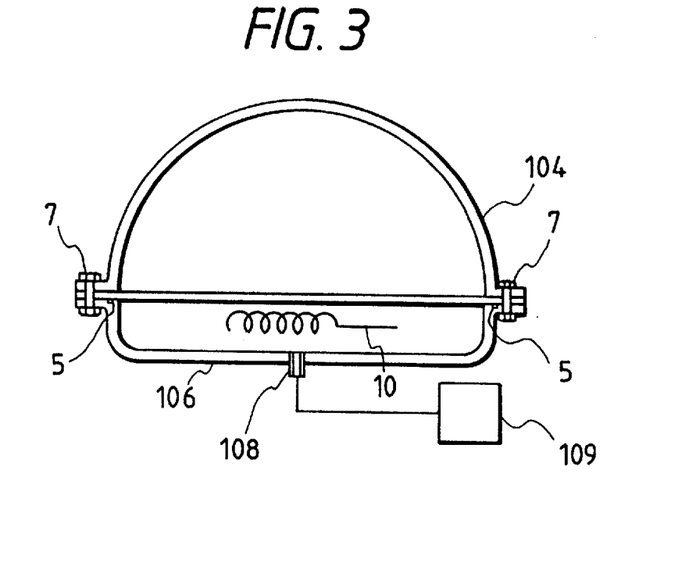
FIG. 3 illustrates another method of manufacturing the concave mirror shown in FIG. 1.

In FIG. 3 which shows a device for manufacturing a single concave mirror piece 11 which constitutes the concave mirror 1 according to the blow forming process, a circular plastic disk 3 is put at its periphery of one surface thereof on a flange portion of a pressurizing chamber 106 through a rubber packing 5 and a metal die 104 in the form of a semi-sphere having a semi-spherical inner surface is put on the other surface of the plastic disk 3. The flanges of the pressurizing chamber 106 and the metal die 104 are fixed together by bolts 7, in which case, the pressurizing chamber 106 is kept air-tight by means of the rubber packing 5. A pipe fitting 108 for pressurized air blow is formed in a bottom of the pressurizing chamber 106, to which an air-compressor 109 is connected. A heater 10 is provided in the pressure vessel 106.

By blowing air from the air-compressor 109 into a space defined by the pressurizing chamber 106 and the plastic disk 3 and hermetically sealed by the rubber packing 5 through the pipe fitting 108, while heating the plastic disk 3 by the heater 10, the plastic disk 3 is softened and deformed upwardly and adhered to the semi-spherical inner surface of the die 4. After cooling the die, the semi-spherical molded resin is derived from the die.

In either of the two molding processes mentioned above, the metal die is used. Alternatively, the concave mirror piece 11 can be formed by a free-blow method which does not use such metal die. In such case, however, a configuration error of a molded resin is relatively large and so the free-blow process is not suitable to form concave mirror pieces 11 which are to be assembled in use. Therefore, the free-blow method should be used when a single concave mirror piece is used as a concave mirror 1.

The reflecting layer may be formed by plating the inner or front surface of the molded resin with metal. However, in view of reflection characteristics of a resultant concave mirror, the reflecting layer is preferably formed by aluminum evaporation. On an aluminum layer thus evaporated, a protective layer of such as low melting point glass is formed by evaporation against environmental conditions. On the contrary, when an outer or rear surface of the spherical molded resin is evaporated with aluminum, a protective coating is formed on a resultant aluminum layer on the rear surface of the molded resin.

The semi-spherical concave mirror thus obtained may be cut to concave mirror pieces 11 each having a predetermined size. It is possible to cut the semi-spherical concave mirror prior to the formation of the reflection layer.

Although the concave mirror piece 11 of synthetic resin has high rigidity, it may be deformed by gravity when its wall thickness is small and its size is large. Therefore, in order to fix the concave mirror piece or pieces 11 in a predetermined position or positions, the frame 2 has to be used. Since the frame 2 should have high rigidity, it should be made of a metal such as aluminum. In this case, a special care should be taken into consideration in order to release stress due to difference in thermal expansion coefficient between the metal frame 2 and the concave mirror pieces 11 of synthetic resin.

Figure 4:
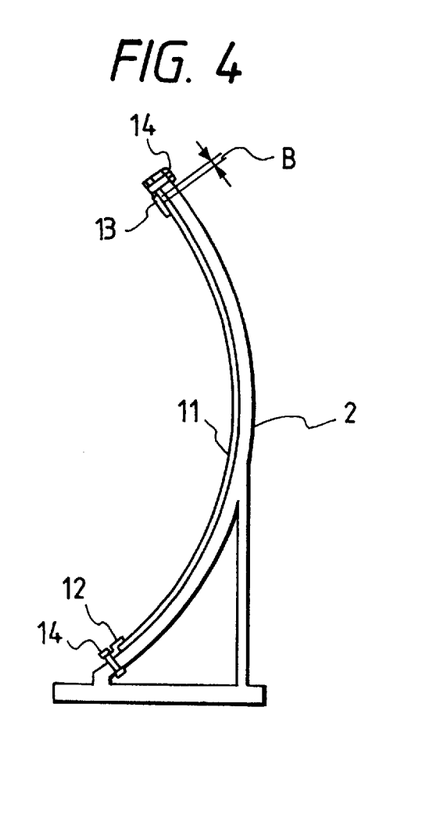
FIG. 4 illustrates a mounting method of the concave mirror shown in FIG. 1.

FIG. 4 is a vertical cross section of the frame 2 and the concave mirror piece 11 fixed thereon shown in FIG. 1. As shown in FIG. 4, the concave mirror piece 11 is supported by a lower and upper holders 12 and 13 fixed to the frame 2 by bolts 14. In this case, it should be noted that the metal holders 12 and 13 fix the concave mirror piece 11 to the frame 2 not rigidly completely but loosely with a small gap therebetween such that the concave mirror piece 11 is movable with respect to the frame 2 to absorb the difference of thermal expansion coefficient between the concave mirror unit and the metal frame. In the shown case, a gap B between the upper metal holder 13 and an upper edge portion of the concave mirror piece 11 is set larger than that between the lower metal holder 12 and a lower edge portion of the concave mirror piece. When a plurality of concave mirror pieces 11 are used in combination as shown in FIG. 1, a small gap may also be provided between adjacent concave mirror pieces 11.

Figure 5:
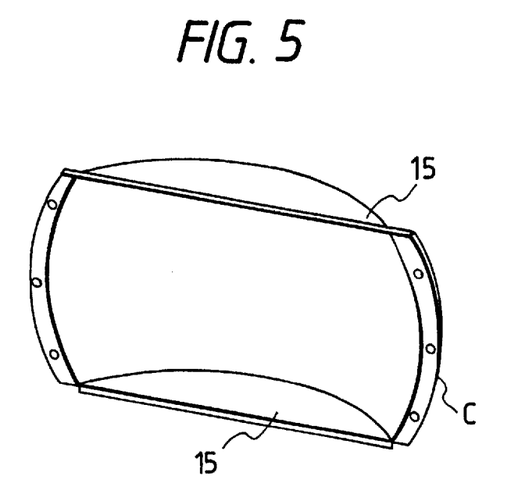
FIG. 5 is a perspective view of a concave mirror of an image display apparatus, according to a second embodiment of the present invention.

FIG. 5 shows an integral concave mirror 110 which is used alone as a concave mirror. The integral concave mirror 110 is prepared in the same manner as in the case of the synthetic resin concave mirror piece 11. In this case, however, only an upper and lower portions of the molded semi-spherical resin are cut away and flange portions thereof are left as they are on both sides as concave mirror mounting portions C. An upper and lower reinforcing plates 15 are provided. When the reinforcing plates 15 are of the same material as that of the concave mirror piece 110, the reinforcing plates 15 may be fixed rigidly by adhesive, etc. When the integral concave mirror 110 is used alone, a setting thereof is facilitated by using the structure of the present invention, since, according to the molding method mentioned above, the thickness and rigidity of the concave mirror are maximum in the flange portion, while the thickness and hence the rigidity is gradually decreased toward the center portion of the mirror. Therefore, it is possible to fix the concave mirror with minimum reinforcement by using the rigid flange portions as the fixing portions of the mirror.

Figure 6:
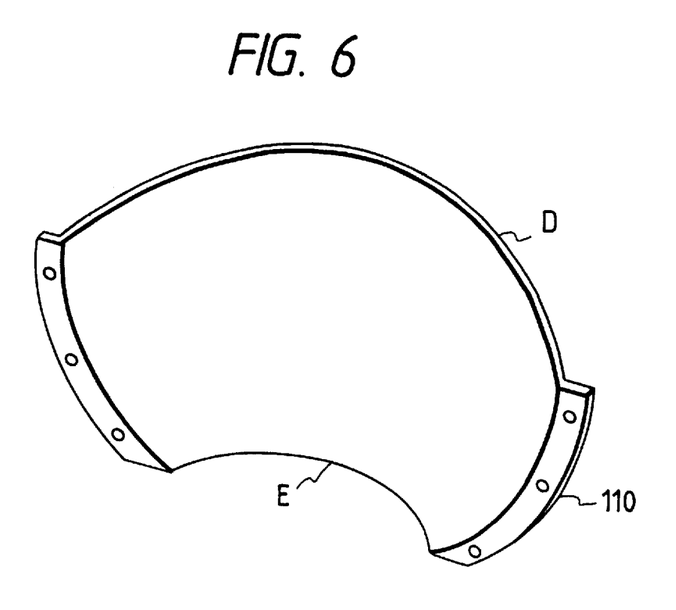
FIG. 6 is a perspective view of a concave mirror of an image display apparatus, according to a third embodiment of the present invention.

FIG. 6 shows another embodiment of an integral concave mirror 110 which is used alone. A feature of the integral concave mirror 110 according to this embodiment is that an upper edge D of the integral concave mirror 110 is longer than a lower side E. With such configuration, it is possible to provide two integral concave mirrors 110 from a single spherical molded dome, as will be described below.

Figure 7:
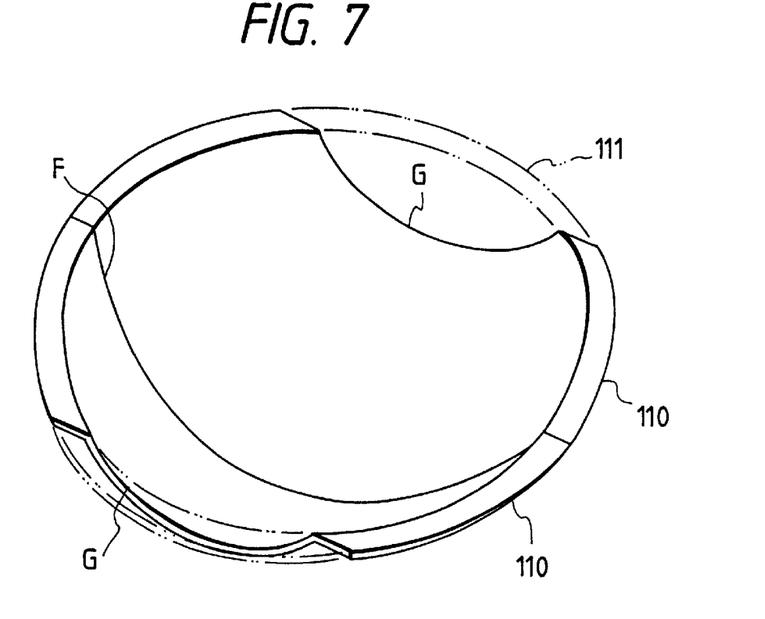
FIG. 7 is a perspective view showing a manufacturing method of a concave mirror according to the third embodiment of the present invention.
Figure 8:
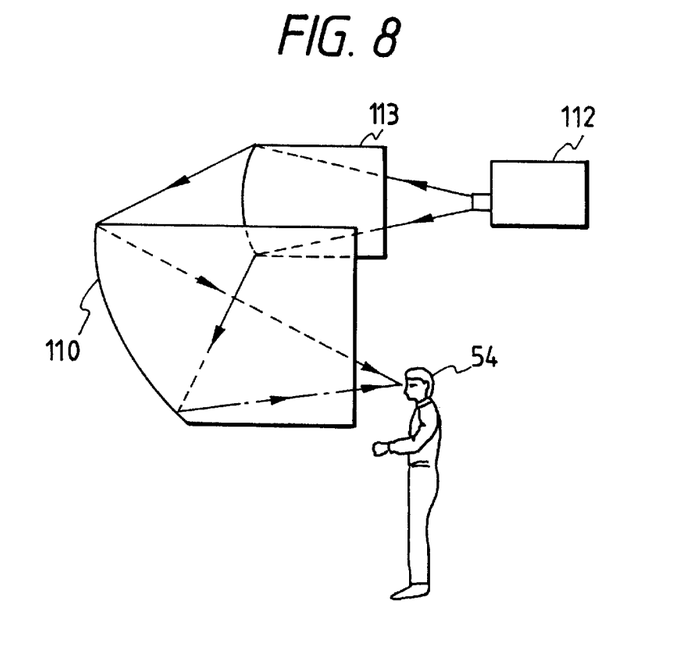
FIG. 8 shows schematically a construction of an image display apparatus using the concave mirror shown in FIG. 6.

FIG. 7 shows a method of providing two of the integral concave mirrors 110 from a flanged, single dome mold 111 molded according to any of the previously mentioned forming processes. As shown, the dome mold 111 is cut along a line F passing through substantially a center of the flanged dome mold 111 to two pieces and portions thereof shown by chain lines are cut away, resulting in two integral concave mirrors 110 each shown in FIG. 6. The integral concave mirror 110 shown in FIG. 6 can be used alone without any substantial functional disadvantage. Describing this with reference to FIG. 8 which shows an image display apparatus using the integral concave mirror 110 according to the present invention, an image projected by an image projector 112 is focused on a transmission type screen 113 and an observer 54 positioned in a position below a center of curvature of the integral concave mirror 110 observes the transmission type screen 113 positioned in an intermediate position between the observer 54 and the integral concave mirror 110, that is, in the vicinity of the focal point of the integral concave mirror 110, through the latter. Since the centers of curvatures of the integral concave mirror 110 and the transmission type screen 113 are close to each other, a lower half of the semi-spherical concave mirror 110 is used. In this example of use, the semi-spherical concave mirror is not always necessary to be cut along the line passing through the center thereof as is shown in FIG. 5, so long as the concave mirror 110 has the upper side D longer than the lower side E. In FIG. 8, the transmission type screen 113 is vertically positioned above the observer 54. However, it is possible to arrange the screen 113 below the observer 54 in which case an upper half of the semi-spherical concave mirror 110 is used.

Figure 9:
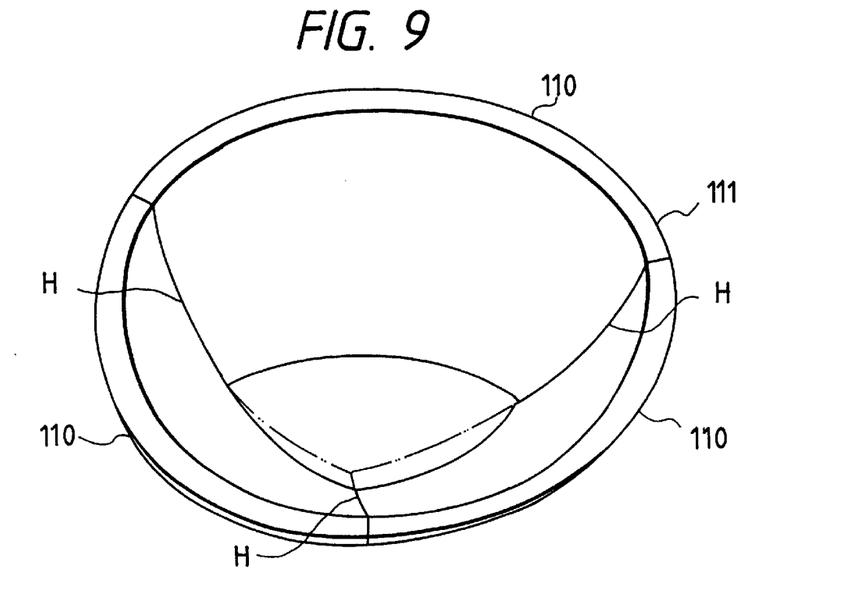
FIG. 9 is a perspective view showing a manufacturing method of a concave mirror according to a fourth embodiment of the present invention.

When it is unnecessary to provide a large horizontal view angle, it is possible to cut out three integral concave mirrors 110 from a flanged dome mold 111, as shown in FIG. 9. In such case, the flanged dome mold 111 is cut along radial lines H to three pieces and lower portions thereof are cut away. Although not shown, when the horizontal view angle can be smaller than that in the above mentioned case, the flanged dome mold 111 can be divided to four pieces or more.

Figure 10:
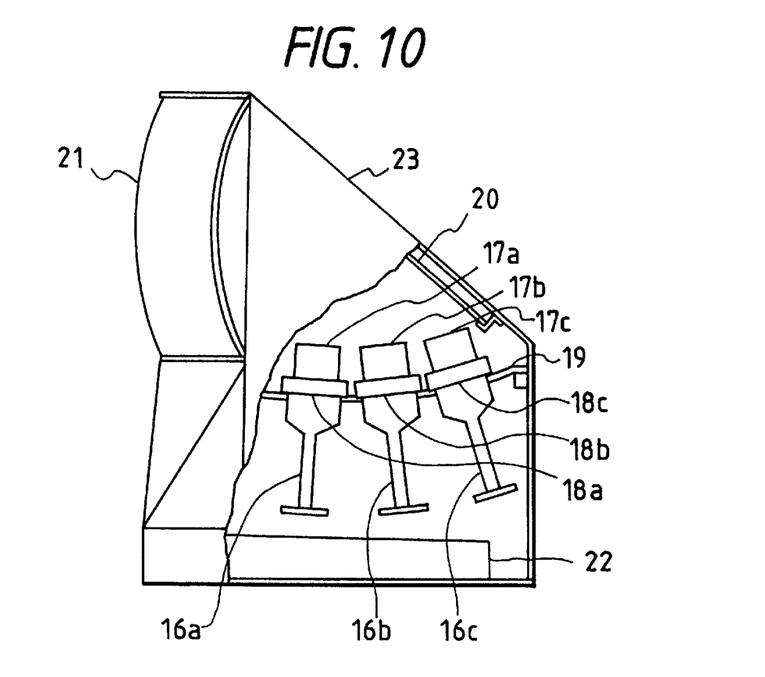
FIG. 10 is a partial cross sectional side view schematically showing an inner construction of a first embodiment of an image projector of the present invention.
Figure 11:
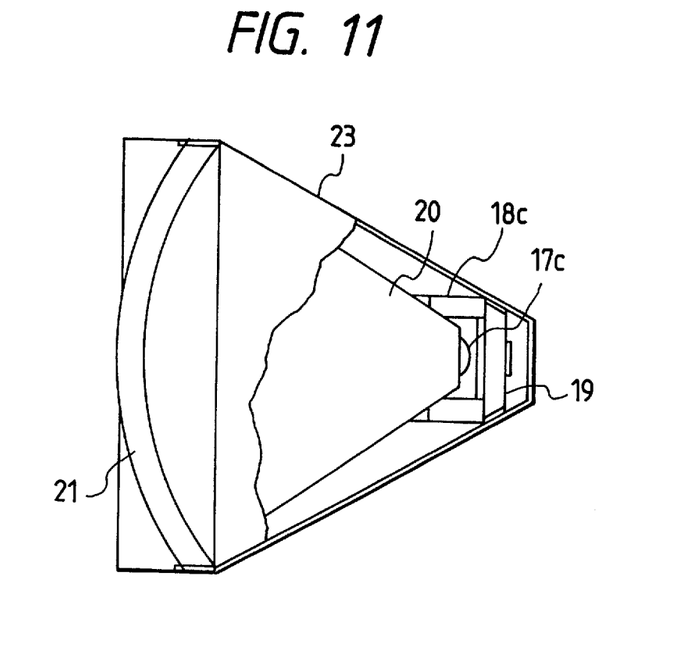
FIG. 11 is a partial cross sectional plan view schematically showing the inner construction of the image projector shown in FIG. 10.

FIG. 10 is a partial cross sectional side view of an image projector according to the present invention and FIG. 11 is a partial cross sectional plan view of the same.

In FIGS. 10 and 11, the image projector includes a red projection type cathode ray tube 16a having a substantially flat phosphor surface panel, a green projection type cathode ray tube 16b having a substantially flat phosphor surface panel, a blue projection type cathode ray tube 16c having a substantially flat phosphor surface panel, a red projection lens 17a, a green projection lens 17b, a blue projection lens 17c, a red coupler 18a for coupling the red cathode ray tube 16a with the red projection lens 17a, a green coupler 18b for coupling the green cathode ray tube 16b with the green projection lens 17b, a blue coupler 18c for coupling the blue cathode ray tube 16c with the blue projection lens 17c, a metal setting part 19 for holding the couplers 18a, 18b and 18c in a constant positional relation, a flat reflecting mirror 20, a transmission type screen 21 having substantially spherical shape, an electric circuit board 22 and a housing 23 for housing the above mentioned various components.

The electric circuit board 22 contains various electric circuits for processing a video signal and controls the cathode ray tubes, such that images (not shown) from the red, green and blue projection type cathode ray tubes 16a, 16b and 16c are enlarged and projected through the respective red, green and blue projection lenses 17a, 17b and 17c onto the transmission type screen 21 on which the red, green and blue images are combined, resulting in a color image on the transmission type screen 21. The flat reflecting mirror 20 is provided between the red, green and blue projection lenses 17a, 17b and 17c and the transmission type screen 21 and functions to bent the projected light beams to thereby reduce the depth, that is, the thickness, of the image projector.

A first feature of the projection optical system of the image projector according to the present invention resides in the use of the projection type cathode ray tubes having substantially flat phosphor surface panels and the use of the transmission type screen having substantially spherical surface. As mentioned previously, this construction is just opposite to the conventional image projector which uses the projection type cathode ray tubes having substantially spherical phosphor planes and the transmission type, substantially flat screen. Further, in the present invention, the projection lenses are not specially designed and may be the same as those used in the conventional device or may be ones which are slightly modified conventional lenses.

Figure 12:
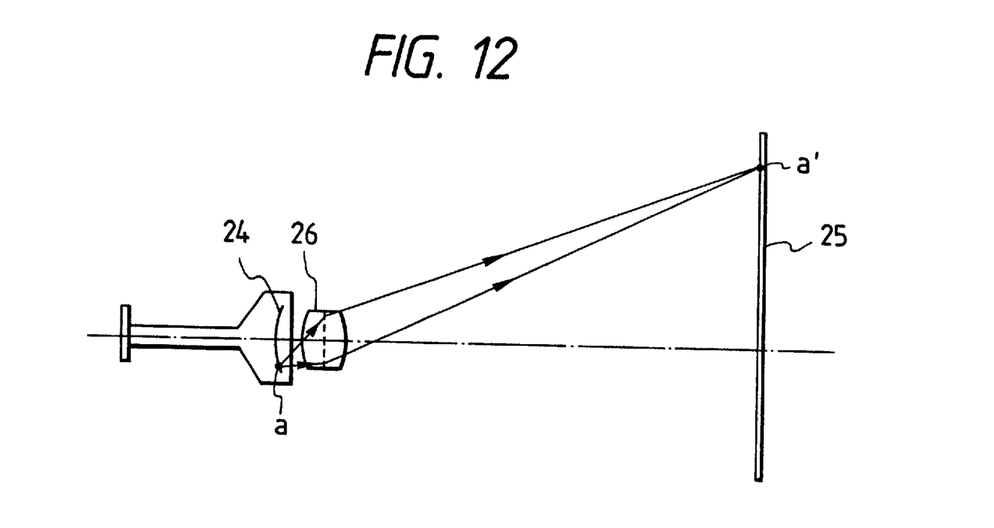
FIG. 12 illustrates a projection optical system of a conventional image display apparatus.

FIG. 12 shows a principle of a projection optical system of a conventional image projector. In FIG. 12, an objective plane 24 of a projection type cathode ray tube corresponds to the phosphor surface panel thereof and an image plane 25 corresponds to the transmission type screen. A projection lens 26 functions to focus an image a on the objective plane 24 onto the image plane 26 as an image a'. The objective plane 24 is usually spherical and the image plane 26 is flat, as shown in FIG. 12.

Figure 13:
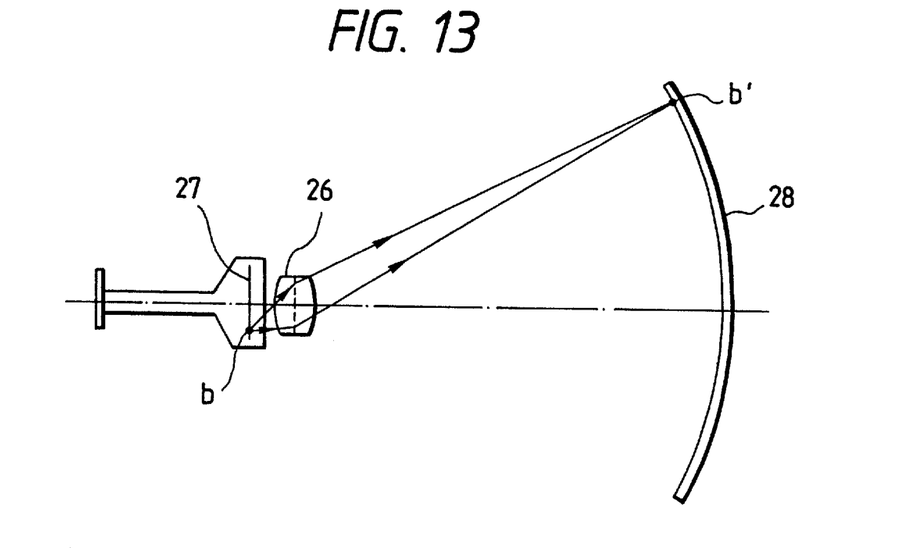
FIG. 13 shows schematically a construction of a first embodiment of an image display apparatus using the concave mirror shown in FIG. 11.

FIG. 13 shows a principle of a projection optical system of an image projector of the present invention. In FIG. 13, a projection lens 26 is the same as that of the conventional optical system shown in FIG. 12. A difference of the present projection optical system from the conventional system is that an objective plane 27 is flat and an image plane 28 is spherical. With the flat objective plane 27, an image b on the objective plane 27 is focussed on the spherical image plane 28 as an image b' as shown in FIG. 13. Therefore, the projection optical system of the image projector according to the present invention can be realized by substituting a projection type cathode ray tube having flat or substantially flat phosphor surface panel for the conventional projection type cathode ray tube having the spherical phosphor surface panel whose radius of curvature may be 350 mm and substituting a spherical screen for the conventional substantially flat screen. When the phosphor surface panel of the projection type cathode ray tube is flat, it is possible to focus an image on a spherical screen having radius of curvature of 450 mm to 650 mm. When a spherical screen having radius of curvature larger than the value mentioned above is required, it is enough to use a projection type cathode ray tube having spherical phosphor surface panel whose radius of curvature is from 600 mm to 800 mm. Alternatively, it is, of course, possible to use a spherical screen having radius of curvature larger than 650 mm by combining a projection lens designed for the cathode ray tube whose phosphor surface panel has radius of curvature in the range from 600 mm to 800 mm with a projection type cathode ray tube having a phosphor surface panel whose radius of curvature is sufficiently large, with the same effect.

Table 1 below shows a result of experiments conducted by the inventors:

TABLE 1

| the curvature of the projection lens formed by the curvature of the phosphor panel of the projection tube when combined with a projection lens corresponding to the projection lens used for a flat screen | radius of curvature of phosphor panel of projection tube (mm) | radius of curvature of spherical screen (mm) | |
|---|---|---|---|
| | | focusing predominant | general use |
| R350 | flat (∞) | R500–R600 | R450–R700 |
| | R600 | R1200–R1450 | R1100–R1650 |
| R600 | flat (∞) | R850–R1050 | R800–R1200 |

Depicting curvature which is an inverse number of the radius of curvature of the phosphor panel of the projection tube by H, curvature which is an inverse number of the radius of curvature of the spherical screen by S and curvature which is an inverse number of the radius of curvature of the phosphor panel of the projection tube combined with a projection lens corresponding to the projection lens used for a flat screen by L, the following relation is established between H, S and L:

$$S = A(L - H)$$

where A is a constant in a range between 0.50 and 0.78. When the focusing performance of the image display device is predominant, it is preferable to set the constant A in a range between 0.57 and 0.71.

Returning to FIG. 10, a second feature of the projection optical system of the image projector according to the present invention with respect to the conventional system resides in that the red, green and blue projection type cathode ray tubes 16a, 16b and 16c are in-line arranged in a substantially flat plane which is substantially perpendicular to the spherical transmission type screen 21. With this arrangement of the red, green and blue projection type cathode ray tubes 16a, 16b and 16c, it is possible to substantially reduce width of a rear portion of the housing 23 in a plan view as shown in FIG. 11. That is, a portion of the housing 23 on the side opposite to the transmission type screen 21 becomes substantially isosceles triangle, as shown in FIG. 11. With such isosceles triangle configuration of the housing 23, it becomes possible to juxtapose a plurality of the image projectors to thereby provide a wide view angle for a multi-screen system.

Figure 14:
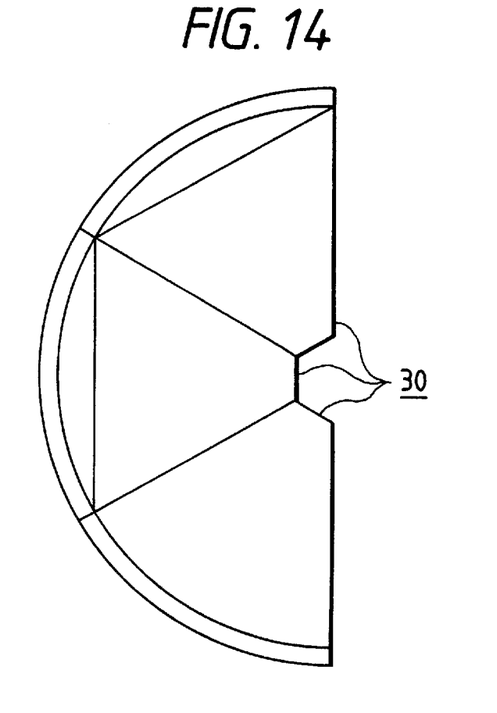
FIG. 14 is a schematic plan view of a system which is composed of three of the image projectors each according to the first embodiment of the present invention and capable of obtaining a view angle of 180 degrees in horizontal direction.
Figure 15:
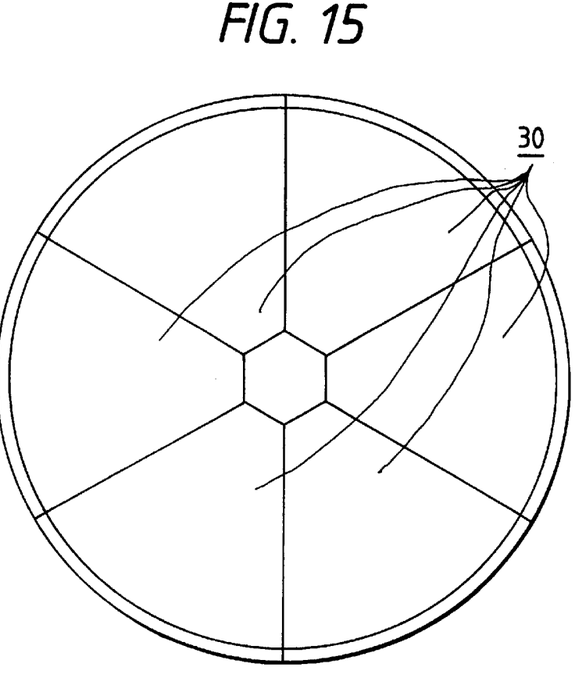
FIG. 15 is a schematic plan view of a multi-screen system which is composed of six of the image projectors each according to the first embodiment of the present invention and capable of obtaining a view angle of 360 degrees in horizontal direction.

FIG. 14 is a schematic plan view of a multi-screen system in which three image projectors 30 each according to the present invention are juxtaposed to provide a horizontal view angle of 180 degrees and FIG. 15 is a schematic plan view of a multi-screen system in which six of the image projectors 30 are juxtaposed to provide a horizontal view angle of 360 degrees.

A third feature of the projection optical system constituting the image projector of the present invention resides in that an optical path is bent by the flat mirror 20 as shown in FIG. 10. Since it is possible to reduce the depth of the image projector by bending the optical path as shown, it is possible to reduce a diameter of a circle which is twice the radius of curvature of the spherical transmission type screen 21 and along which the projection lenses of the image projectors 30 are arranged as shown in FIG. 14 or 15.

Figure 16:
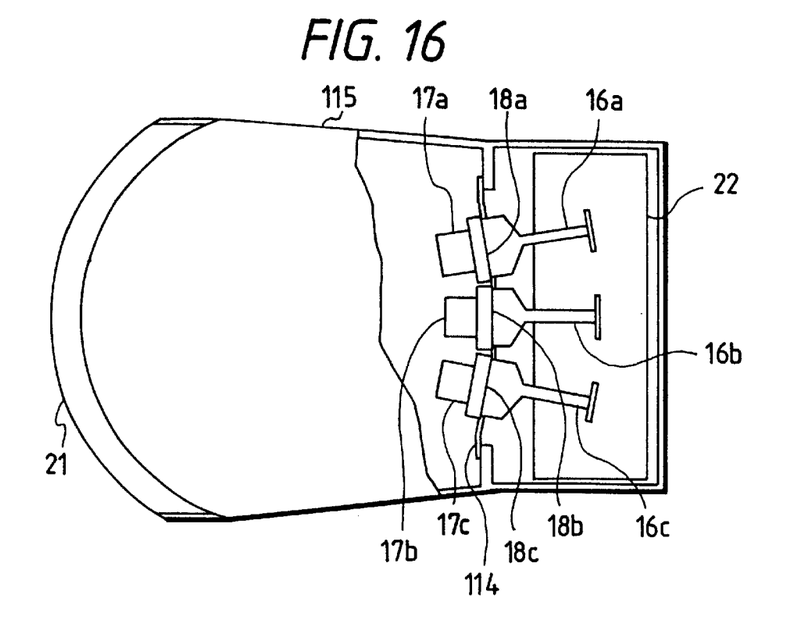
FIG. 16 is a schematic cross sectional plan view of an image projector according to a second embodiment of the present invention, showing an inner construction thereof.

Although the image projector having the red, green and blue projection type cathode ray tubes 16a, 16b and 16c in-line arranged in the substantially horizontal plane substantially perpendicular to the spherical transmission screen 21 is shown in FIG. 10 and described, the red, green and blue projection type cathode ray tubes 16a, 16b and 16c may be in-line arranged in the substantially vertical plane substantially parallel to the spherical transmission screen 21, as shown in FIG. 16 which is a partial cross section plan view of another embodiment of the image projector according to the present invention and in which the same components as those in FIG. 10 are depicted by the same reference numerals, respectively.

In FIG. 16, the image projector includes a red projection type cathode ray tube 16a having substantially flat phosphor surface panel, a green projection type cathode ray tube 16b having substantially flat phosphor surface panel, a blue projection type cathode ray tube 16c having substantially flat phosphor surface panel, a red projection lens 17a, a green projection lens 17b, a blue projection lens 17c, a red coupler 18a for coupling the red projection type cathode ray tube 16a with the red projection lens 17a, a green coupler 18b for coupling the green projection type cathode ray tube 16b with the green projection lens 17b, a blue coupler 18c for coupling the blue projection type cathode ray tube 16c with the blue projection lens 17c, a metallic setting plate 114 for mounting the couplers 18a, 18b and 18c in a constant positional relation, a substantially spherical transmission screen 21 substantially in parallel to the metal setting plate 114, an electric circuit board 22 and a housing 115 for housing these parts.

In FIG. 16, although the principle of projection of an image on the spherical transmission screen 21 is the same as that of the embodiment shown in FIG. 10, the flat mirror 20 used in the embodiment in FIG. 10 in order to reduce the depth of the image projector is not used in this embodiment. The embodiment shown in FIG. 16 is effective in reducing the height of the image projector.

Figure 17:
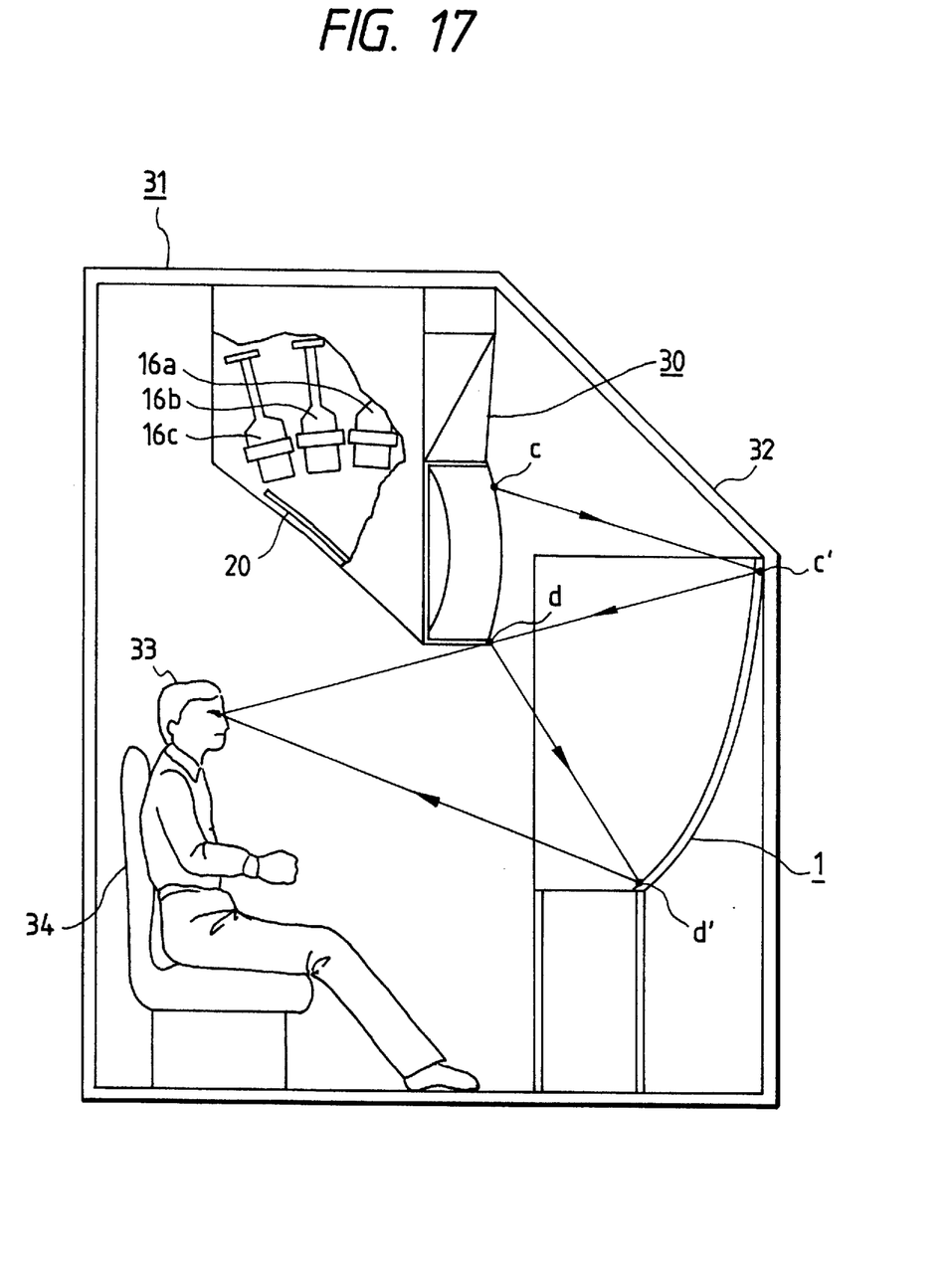
FIG. 17 is a partial cross sectional side view of an embodiment of an image display apparatus according to the present invention, which is a combination of the first embodiment of the concave mirror of the present invention and the first embodiment of the image projector of the present invention.

An embodiment of an image display apparatus 31 composed of a image projector 30 and a concave mirror 1 both of which are constructed according to the present invention is shown in FIG. 17.

In FIG. 17, a frame 32 of the image display apparatus 31 fixes the image projector 30 and the concave mirror body 1 in predetermined positions so that a viewer 33 sitting on a chair 34 can observe the concave mirror 1 easily. An image c on a transmission type screen 21 of the image projector 30 is reflected at a point c' of the concave mirror 1 to the viewer 33 and an image d on the transmission type screen is reflected at a point d' on the concave mirror to the viewer 33. The red, green and blue projection type cathode ray tubes 16a, 16b and 16c of the image projector 30 are arranged in an upper portion of the image display device 31 and the transmission screen 21 is arranged in a lower portion thereof. Since the optical path of the image projector 30 is bent by a flat mirror 20, there is given a large space above the viewer 33, removing an oppressive sensation. The effect of removal of oppressive sensation can be also obtained in the multi-screen system in which, for example, six of the present image projectors 30 are arranged to provide the view angle of 360 degrees in horizontal direction as shown in FIG. 15. In the latter case, it is, of course, necessary to provide a concave mirror having view angle of 360 degrees in horizontal direction by combining a plurality of the concave mirror pieces.

When a single image projector 30 is used, the view angle in horizontal direction is usually 70 degrees or less. This angle is depends upon an aspect ratio of the screen of the image projector 30. That is, since the vertical view angle of the image display apparatus using the concave mirror is 40 degrees at most, the horizontal view angle of the image projector 30 whose screen has an aspect ratio of 16:9 becomes 70 degrees. When the horizontal view angle wider than this is required, a plurality of the image projectors 30 are arranged to obtain a desired view angle as shown in FIG. 9 or 10.

Figure 18:
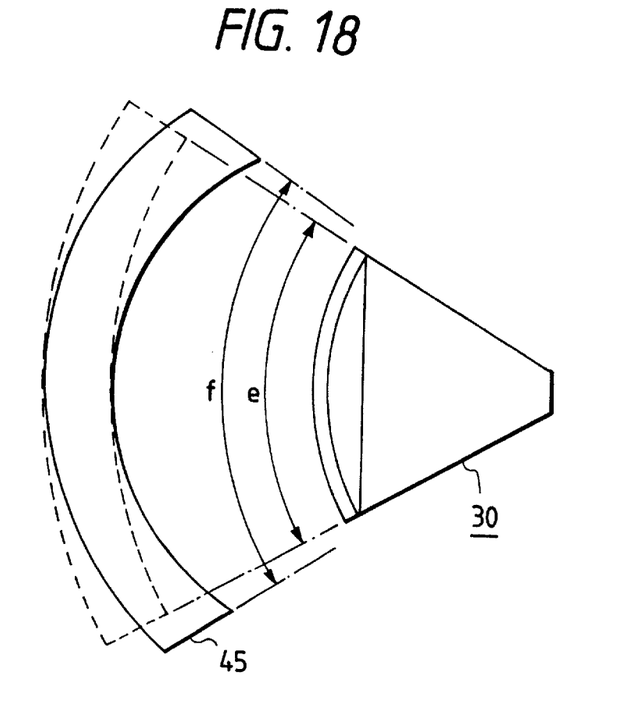
FIG. 18 is a plan view of another embodiment of the image display device of the present invention, which is a combination of a fifth embodiment of the concave mirror according to the present invention and the first embodiment of the image projector according to the present invention.

In a case where a wide horizontal view angle is required in a limited installation space such as in a small size simulator, a construction such as shown in FIG. 18 may be used. FIG. 18 is a schematic plan view of a system which is capable of providing a horizontal view angle of 70 degrees or more by using a single image projector 30.

In FIG. 18, the system comprises an image projector 30 according to the present invention and a concave mirror 45 according to an embodiment of the present invention. Contrary to the described concave mirror which is substantially spherical as shown by a dotted line in FIG. 18, the concave mirror 45 is featured by that radius of curvature of a peripheral portion thereof is smaller than that of a center portion thereof. Since the smaller the radius of curvature of a concave mirror provides the larger the power, the size of image projector may be relatively smaller. Therefore, by making the radius of curvature of the peripheral portion of the concave mirror smaller than that of the center portion thereof, it is possible to widen the horizontal view angle from e to f as shown in FIG. 18 if the size of the image projector is unchanged. In the latter case, image distortion can be compensated for by a convergence circuit which may be included in the image projector and astigmatism which occurs simultaneously may be negligible since it is in the peripheral portion of the screen.

The concave mirror 45 shown in FIG. 18 is aspheric and its manufacture may be little difficult. It is, of course, possible to widen the horizontal view angle over 70 degrees by using a substantially spherical concave mirror when a wide screen having aspect ratio more than 16:9 is used as the screen of the image projector 30.

Figure 19:
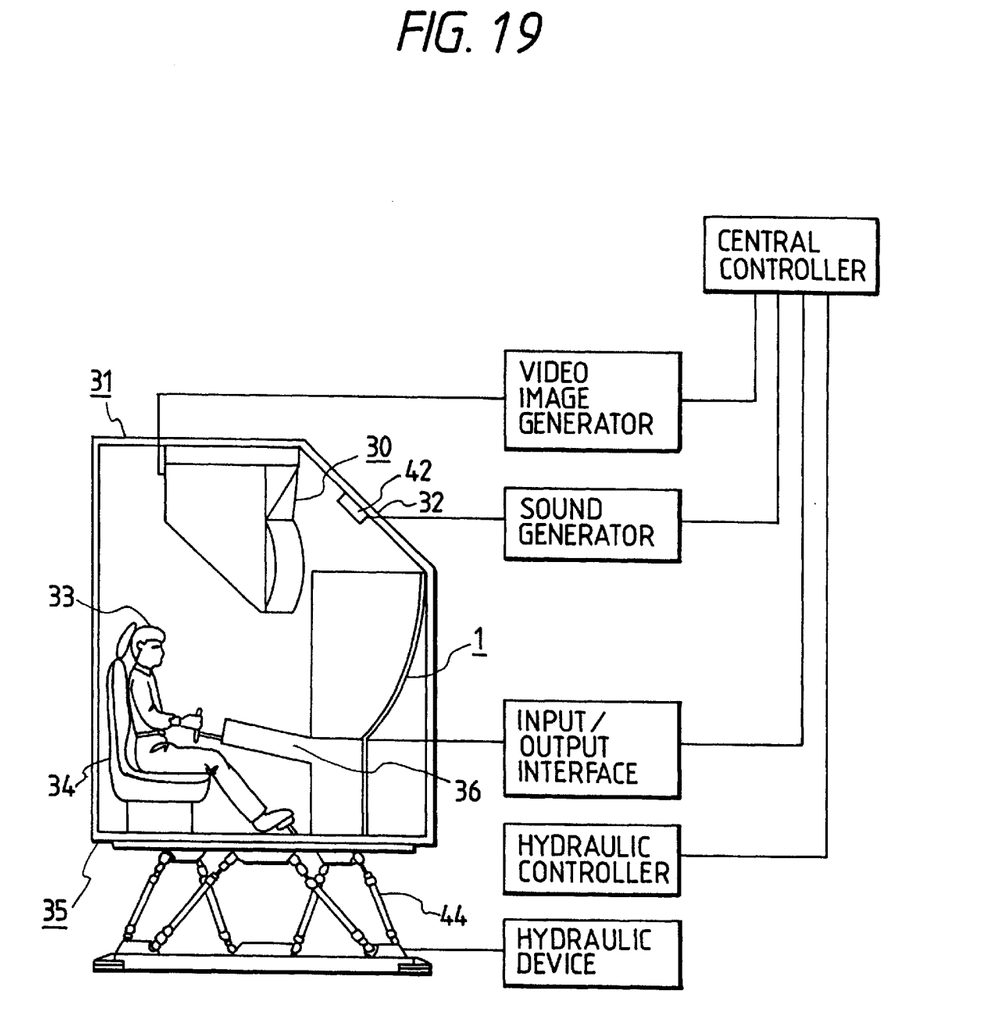
FIG. 19 shows schematically a sensory integration system employing an image display apparatus according to the first embodiment of the present invention which is a combination of the concave mirror according to the first embodiment of the present invention and the image projector according to the first embodiment of the present invention.

FIG. 19 shows schematically a sensory integration system 35 which comprises an image display apparatus 31 which includes an image projector 30 and a concave mirror 1 of the present invention. In FIG. 19, the same components as those in FIG. 17 are depicted by the same reference numerals, respectively. In the sensory integration system 35 shown in FIG. 19, a loud speaker 42 and an input/output device 36 are provided in the image display device 31. A frame 32 of the the image display device 31 is supported mechanically by a motion system 44. The image projector 30 is connected to a video image generator 39. The loud speaker 42 is connected to a sound generator 40. The video image generator 39 and the sound generator 40 are controlled by a central control unit 38. The input/output device 36 is connected through an input/output interface 37 to the central control unit 38. The motion system 44 is driven by a hydraulic drive 43 under control of a hydraulic control unit 41 which is under control of the central control unit 38.

In the sensory integration system 35 constructed as mentioned above, an operator 33 steers the input/output device 36 while watching, through the concave mirror 1, a video image supplied from the video image generator 39 and displayed on a screen of the image projector 30. The steering motion given to the input/output device 36 is transmitted through the input/output interface 37 to the central control unit 38. The central control unit 38 sends instructions to the video image generator 39, the sound generator 40 and the hydraulic control unit 41 according to an amount of motion of the input/output device 36. The video image generator 39 moves the image on the screen of the image projector 30 according to the instruction therefor, the sound generator 40 generates sound through the loud speaker 42 according to the instruction therefor and the hydraulic control unit 41 drives the motion system 44 through the hydraulic device 43 according to the instruction therefor, to thereby give a realistic and specific feeling to the operator 33 who uses the sensory integration system 35.

As described hereinbefore, according to the present invention, it is possible to provide a concave mirror whose rigidity is high compared with an aluminum foil mirror and whose weight and manufacturing cost are low compared with a polished glass mirror, by using a single mirror component of a synthetic resin material molded to a concave shape and vapor deposited with aluminum film or a combination of a plurality of mirror components each prepared similarly. The present invention further provides an image display apparatus using the same concave mirror.

Comparing with the conventional image projector which includes the projection type cathode ray tube having the substantially spherical phosphor surface panel and the substantially flat screen, the image projector according to the present invention includes at least a projection type cathode ray tube having a flat or substantially flat phosphor surface panel and a substantially spherical screen.

The concave mirror of the present invention which is formed by molding synthetic resin has a rigidity higher than the aluminum foil mirror and is light weight and low cost compared with the polished glass mirror. Further, since it is possible to project an image on the substantially spherical screen without using any special lens, it is possible to substantially reduce the cost of the image projector.

Further, in the projection optical system of the image projector according to the present invention, the red, green and blue projection type cathode ray tubes are in-line arranged in a substantially flat plane substantially perpendicular to the substantially spherical transmission type screen. When the substantially flat plane in which the cathode ray tubes are in-line arranged is vertical, it is possible to substantially reduce the size of a rear portion of a housing of the image projector in a plan view, allowing a plurality of the image projectors to be juxtaposed to thereby provide a wide horizontal view angle for a multi-screen system.

The image display apparatus equipped with either or both of the present concave mirror and the image projector and the sensory integration system equipped with the image display apparatus are also within the scope of the present invention.

What is claimed is:

1. A sensory integration system comprising at least an image display apparatus including an image projector and a concave mirror for reflecting the real image projected from said image projector to a viewer, said concave mirror being composed of at least a concave mirror piece of synthetic resin material and a reflecting layer formed on one surface of said concave mirror piece.

2. The sensory integration system claimed in claim 1, wherein one side of opposing sides of said concave mirror is longer than the other side of said mirror.

3. The sensory integration system claimed in claim 1, wherein radius of curvature of a peripheral portion of said concave mirror is smaller than radius of curvature of a center portion of said concave mirror.

4. The sensory integration system claimed in claim 1, wherein said one surface of said concave mirror is a concave side surface of said concave mirror and said reflecting layer is formed by vapor-deposition of aluminum, and further comprising a protective layer of a low melting point glass material formed on said reflecting layer by vapor deposition.

5. The sensory integration system claimed in claim 1, wherein said synthetic resin material is transparent and said one surface of said concave mirror is a convex side surface of said concave mirror and said reflecting layer of said concave mirror is formed by vapor deposition of aluminum, and further comprising a transparent or opaque protective layer formed on said reflecting layer.

6. The sensory integration system claimed in claim 3, wherein said concave mirror has a radius of curvature of 1 m or more and a lateral length of 1 m or more.

7. The sensory integration system claimed in claim 1, wherein said concave mirror comprises a combination of a plurality of said concave mirror pieces.

8. The sensory integration system claimed in claim 7, wherein the plurality of said concave mirror pieces is supported by a frame with a gap between each of the said concave mirror pieces and said frame such that said concave mirror pieces are movable with respect to the frame.

9. The sensory integration system claimed in claim 1, wherein an aspect ratio of lateral length to vertical length of said concave mirror is about 4:3 or larger.

10. An image display apparatus comprising:
a video source for displaying a real image; and,
a concave mirror made of a synthetic resin for reflecting the image displayed on said video source, said concave mirror comprising a reflecting layer formed on one surface thereof, a peripheral portion of said concave mirror having a radius of curvature smaller than a radius of curvature of a center portion of said concave mirror.

11. A sensory integration system comprising at least an image display apparatus including:
a video source for producing a real image, said video source including a video projector of a rear face projection type; and,
a real image screen portion for displaying the real image from said video source, said real image screen being concave on the side of said video source and having an aspect ratio of lateral length to vertical length of about 4:3 or larger.

12. A sensory integration system comprising at least an image display apparatus including:
a video source for producing a real image, said video source including a projection tube having a flat or substantially flat phosphor panel and a substantially spherical screen; and,
a real image screen portion for displaying the real image from said video source, an aspect ratio of lateral length to vertical length of said real image screen portion being about 4:3 or larger.

13. A sensory integration system comprising at least an image display apparatus including a video source for producing a real image, the video source including a projection tube with an inverse radius of curvature H, a real image screen portion having an inverse radius of curvature S for displaying the real image projected from said video source by a projection lens having an inverse radius of curvature L, and a concave mirror for reflecting the real image displayed on said real image screen, where:

$$S = A(L-H),$$

where A is a constant in a range from 0.50 to 0.78.

14. The sensory integration system claimed in claim 13, wherein the constant A is in a range from 0.57 to 0.71.

15. The sensory integration system claimed in claim 13, wherein said concave mirror is of a synthetic resin and has a reflecting layer formed on one surface thereof.

16. The sensory integration system claimed in claim 13, wherein one side of opposing sides of said concave mirror is longer than the other side of said mirror.

17. The sensory integration system claimed in claim 13, wherein radius of curvature of a peripheral portion of said concave mirror is smaller than radius of curvature of a center portion of said concave mirror.

18. The sensory integration system claimed in any of claims 13, wherein an optical path of a projection optical system in said video source is bent by a flat mirror.

19. The sensory integration system claimed in claim 13, wherein said video source includes red, green and blue projection type cathode ray tubes and said red, green and blue projection type cathode ray tubes are in-line arranged in a horizontal plane substantially perpendicular to said screen portion.

20. The sensory integration system claimed in claim 13, wherein said video source is housed in a housing having a substantially isosceles triangle shape in plan view with a front side being wider.

21. The sensory integration system claimed in claim 13, wherein a horizontal linearity of a center portion of an image displayed on said real image screen portion is larger than that of a peripheral portion of the image.

22. An image display apparatus comprising:
   a video source for displaying a real image; and,
   a concave mirror made of a synthetic resin for reflecting the image displayed on said video source, said concave mirror comprising:
      a reflecting layer formed on one surface thereof, said reflecting layer being formed by vapor-deposition of aluminum, and
      a protective layer of a low melting point glass material formed on said reflecting layer by vapor deposition.

23. An image display apparatus comprising:
   a video source for displaying a real image; and,
   a concave mirror made of a transparent synthetic resin for reflecting the image displayed on said video source, said concave mirror comprising a reflecting layer on a convex side surface of said mirror, said reflecting layer being formed by vapor deposition of aluminum, and a transparent or opaque protective layer on said reflecting layer.

24. An image display apparatus comprising:
   a video source for displaying a real image; and,
   a concave mirror for reflecting the image displayed on said video source, a peripheral portion of said concave mirror having a radius of curvature smaller than a radius of curvature of a center portion of said concave mirror, said concave mirror having opposing sides with one side being longer than the other side.

25. A concave mirror made of a synthetic resin for reflecting an image displayed on a video source for displaying a real image, said mirror comprising a reflecting layer formed on one surface thereof, said mirror comprising a peripheral portion which has a radius of curvature smaller than a radius of curvature of a center portion of said concave mirror.

26. A concave mirror for reflecting an image displayed on a video source for displaying a real image, said concave mirror having:
   a reflecting layer found on one surface thereof, said reflecting layer being formed by vapor-deposition of aluminum, and
   a protective layer of a low melting point glass material formed on said reflecting layer by vapor deposition.

27. A concave mirror for reflecting an image displayed on a video source for displaying a real image, said concave mirror being of a transparent synthetic resin and having a reflecting layer found on a convex side surface thereof, said reflecting layer being formed by vapor deposition of aluminum, and protective layer on said reflecting layer.

28. A concave mirror for reflecting an image displayed on a video source for displaying a real image, said concave mirror having opposing sides with one side being longer than the other side, said concave mirror having a peripheral portion of said concave mirror which has a radius of curvature smaller than a radius of curvature of a center portion of said concave mirror.

29. An image display apparatus comprising a video source for displaying a real image and a concave mirror having a reflecting layer formed on one surface thereof for reflecting the image displayed on said video source, a radius of curvature of a peripheral portion of said concave mirror being smaller than a radius of curvature of a center portion of said concave mirror.

30. An image display apparatus comprising a video source for displaying a real image and a concave surface for giving a true representation of the image displayed on said video source, a radius of curvature of a peripheral portion of said concave surface being smaller than a radius of curvature of a center portion of said concave surface, said concave surface having a radius of curvature of 1 m or more and a lateral length of 1 m or more.

31. The image display apparatus claimed in claim 29, wherein said concave mirror comprises a combination of a plurality of concave mirror pieces.

32. The image display apparatus claimed in claim 31, wherein each of the plurality of said concave mirror pieces is supported by a frame with a gap with respect to said frame such that said concave mirror pieces are movable with respect thereto.

33. An image display apparatus comprising a video source for displaying a real image and a concave surface for giving a true representation of the image displayed on said video source, a radius of curvature of a peripheral portion of said concave surface being smaller than a radius of curvature of a center portion of said concave surface, an aspect ratio of lateral length to vertical length of said concave surface being about 4:3 or larger.

34. A concave mirror having a reflecting layer formed on one surface thereof for reflecting an image displayed on a video source for displaying a real image, a radius of curvature of a peripheral portion of said concave mirror being smaller than a radius of curvature of a center portion of said concave mirror.

35. An image display apparatus comprising:
   a video projector of a rear face projection type for producing a real image;
   a real image screen is concave on the side of said video projector for displaying the real image from said video projector, an aspect ratio of lateral length to vertical length of said real image screen portion is about 4:3 or larger.

36. The image display apparatus claimed in claim 35, wherein said video source comprises a projection tube having a flat or substantially flat phosphor panel and a substantially spherical screen.

37. An image display apparatus comprising:
   a video source for producing a real image, including a projection tube having a phosphor panel with an inverse of a radius of curvature H;

a real image screen portion having an inverse of a radius of curvature S for displaying the real image projected from said video source by a projection lens having an inverse of a radius of curvature L; and a concave mirror for reflecting the real image displayed on said real image screen, wherein the following relation is established:

$$S = A(L-H),$$

where A is a constant in a range from 0.50 to 0.78.

38. The image display apparatus claimed in claim 37, wherein the constant A is in a range from 0.57 to 0.71.

39. The image display apparatus claimed in claim 37, wherein said concave mirror is of a synthetic resin and has a reflecting layer formed on one surface thereof.

40. The image display apparatus claimed in claim 37, wherein one side of opposing sides of said concave mirror is longer than the other side of said mirror.

41. The image display apparatus claimed in claim 37, wherein radius of curvature of a peripheral portion of said concave mirror is smaller than radius of curvature of a center portion of said concave mirror.

42. The image display apparatus claimed in claim 37, wherein an optical path of a projection optical system in said video source is bent by a flat mirror.

43. The image display apparatus claimed in claim 37, wherein said video source includes red, green and blue projection type cathode ray tubes and said red, green and blue projection type cathode ray tubes are in-line arranged in a horizontal plane substantially perpendicular to said screen portion.

44. The image display apparatus claimed in claim 37, wherein said video source is housed in a housing having a substantially isosceles triangle shape in plan view with a front side being wider.

45. The image display apparatus claimed in claim 37, wherein a horizontal linearity of a center portion of an image displayed on said real image screen portion is larger than that of a peripheral portion of the image.

46. A concave mirror for reflecting an image displayed on a video source for displaying a real image, said concave mirror having a radius of curvature of 1 m or more and a lateral length of 1 m or more, the radius of curvature of a peripheral portion of said concave mirror being smaller than the radius of curvature of a center portion of said concave mirror.

47. The concave mirror claimed in claim 34, wherein said concave mirror comprises a combination of a plurality of said concave mirror pieces.

48. The concave mirror claimed in claim 47, wherein each of the plurality of said concave mirror pieces is supported by a frame with a gap with respect to said frame such that said concave mirror pieces are movable with respect thereto.

49. A concave mirror for reflecting an image displayed on a video source for displaying a real image, a radius of curvature of a peripheral portion of said concave mirror being smaller than radius of curvature of a center portion of said concave mirror, an aspect ratio of lateral length to vertical length of said concave mirror being about 4:3 or larger.

* * * * *